E. J. VAUDREUIL.
MACHINE FOR TREATING VEGETABLE PRODUCTS FOR CANNING.
APPLICATION FILED DEC. 10, 1914.
1,154,675.
Patented Sept. 28, 1915.
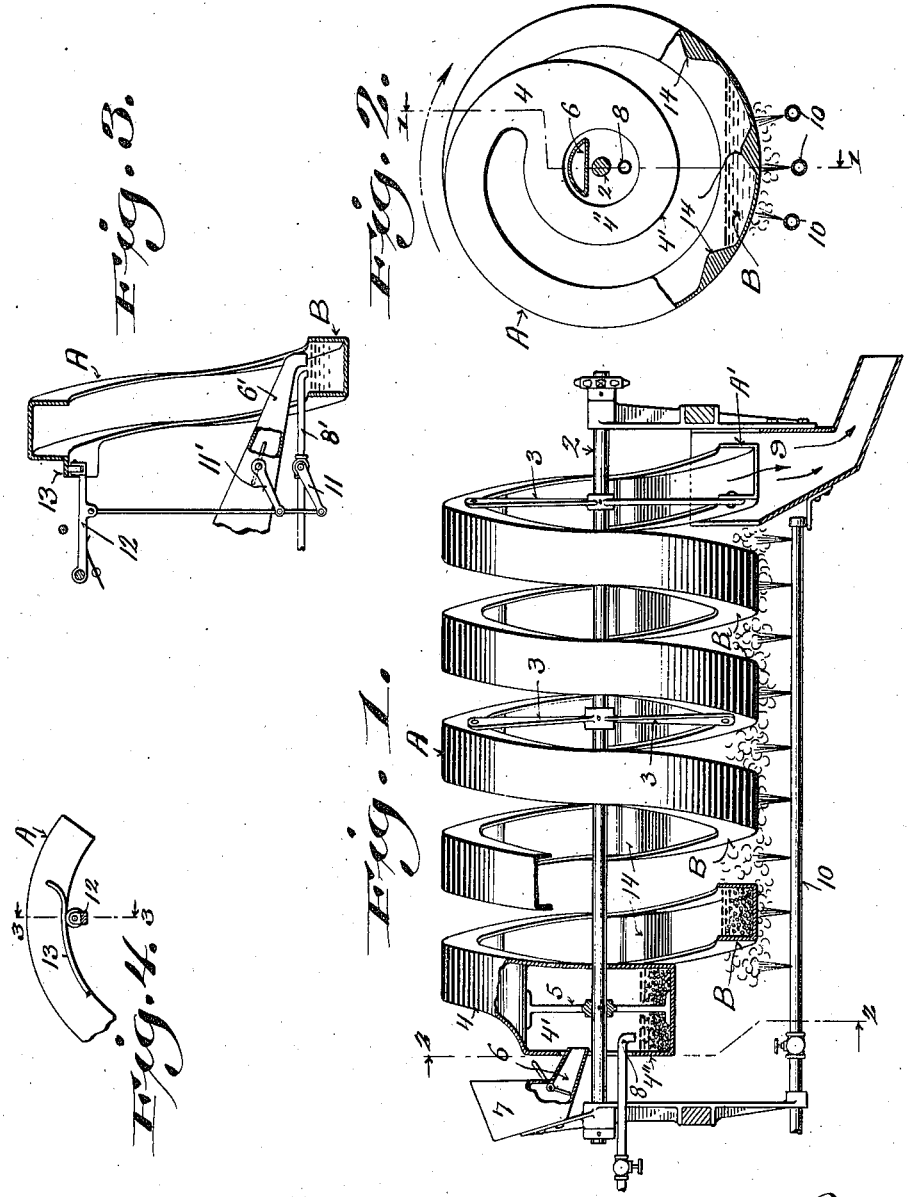

UNITED STATES PATENT OFFICE.

EDWARD J. VAUDREUIL, OF EAU CLAIRE, WISCONSIN, ASSIGNOR TO INTERNATIONAL CANNING MACHINERY CO., OF OWEN, WISCONSIN.

MACHINE FOR TREATING VEGETABLE PRODUCTS FOR CANNING.

1,154,675.  Specification of Letters Patent.  Patented Sept. 28, 1915.

Application filed December 10, 1914. Serial No. 876,410.

*To all whom it may concern:*

Be it known that I, EDWARD J. VAUDREUIL, a citizen of the United States, and resident of Eau Claire, in the county of Eau Claire and State of Wisconsin, have invented certain new and useful Improvements in Machines for Treating Vegetable Products for Canning; and I do hereby declare that the following is a full, clear, and exact description thereof.

My invention has for its object to provide a simple, effective and economical machine for treating vegetables for canning whereby measured quantities of the vegetable and measured quantities of liquid are commingled into unitary batches and caused to travel through the lower sections of a U-shaped spiral conveyer.

My invention is particularly applicable for washing or blanching vegetables of the pulse type such as peas, and when utilized as a blancher the advantages are manifest owing to the fact that the product is cooked in a series of measured batches each containing its own measured quantity of fresh water. Thus, in a blanching and cooking operation, the first and last batch of the product of a factory-run will be of the same high grade as to quality, which high grade is rendered possible for the reason that each batch of peas is cooked in its own measured quantity of water.

The apparatus, when utilized as a blancher or cooker, is similar in effect to that disclosed in my Patent No. 1,131,299, dated Mar. 9, 1915, for improvements in apparatus for cooking pulse.

It is also understood from the foregoing that the machine for which I am at present making application for patent is equally efficient as a washer wherein peas in batches are delivered to the lower sections of the spiral together with the desired quantity of water and, as the unitary batches travel from the feed end of the spiral to its discharge end, they are agitated and thoroughly scoured, whereby the proper washing is effected preparatory to being discharged into a hopper for the next step in the canning process.

With the above objects in view the invention consists in certain peculiarities of construction and combination of parts as set forth hereinafter with reference to the accompanying drawings and subsequently claimed.

In the drawings Figure 1 represents an elevation of a machine embodying the features of my invention with parts broken away and parts in section as indicated by line 1—1 of Fig. 2, to more clearly show details of construction; Fig. 2, an end section, as indicated by line 2—2 of Fig. 1; Fig. 3, a fragmentary detailed sectional view of the feed end of the machine showing another form of controlling the feed in measured quantities, and Fig. 4, a detailed face view of a valve tripping cam which constitutes a revoluble element of the machine.

Referring by characters to the drawings A represents a spiral conveyer, the flights of which are U-shaped in cross-section and inwardly inclined, whereby they form cup sections 1 at the bottom of the spiral for the reception of material to be operated upon. It is understood that the cup-shaped flights may be indefinitely multiplied for accomplishing the desired purpose, the lower section of each flight, as previously stated, forming a container B, for a measured quantity of the product. The skeleton conveyer is supported upon a driven shaft 2 by arms 3 and the last flight at the feed end of the machine is merged into a curved delivery throat 4, which throat extends centrally of the axis of the spiral about the supporting shaft in the form of a receiving head 4′, having inturned end flanges 4″, whereby material discharged therein is retained. The head is supported by a spider 5 which extends from the shaft and the open end of said head is adapted to receive the valve-controlled nozzle 6 of a hopper 7 and also the valve-controlled nozzle 8 of a fluid pipe which leads to a fluid supply, the hopper being adapted to receive peas or other vegetable product to be treated.

By regulating the valves of the nozzles with respect to their discharge orifices it is apparent that a constant flow or measured quantity of each element discharged into the head is effected with relation to one revolution of the spiral which is driven at a uniform comparatively slow speed. The mouth A' of the discharge end flight of the conveyer spiral is revolved in a plane above a receiving hopper 9, whereby the material is discharged from the U-shaped spiral and collected. The lower product containing cup sections B have fitted thereunder any type of heating medium 10, whereby the product is subjected to a blanching or cooking temperature coincident to its travel from the feed end to the discharge end of said spiral.

Referring to Figs. 3 and 4 of the drawings, the water nozzle 8' and the pulse-feeding nozzle 6' are provided with valve members, the stems of which have secured thereto arms 11, 11'. The arms are in link connection with a spring-controlled actuating lever 12, one end of which is provided with an anti-friction roller adapted to engage a cam-plate 13 that is revoluble with the spiral conveyer. In this form of my invention, with each revolution of the spiral conveyer, the valve mechanism is actuated by the cam for a predetermined distance through the travel of said conveyer, to thus cause a measured quantity of water and pulse to be discharged into the cup-like section B, as it travels under the nozzles, the valve mechanism being closed at a predetermined time under control of the cam. Thus, with each revolution of the spiral, a measured batch of material is delivered into the first cup section and the succeeding revolution of the spiral will cause this batch to travel the distance of one flight toward the feed end and the first empty cup section will again pass under the nozzle for a second batch, and so on, whereby a continuous operation of feeding in batches is obtained similar to that described in connection with the first type of feeding mechanism mentioned.

The bottom of the U-shaped or cup-like conveyer is formed with a series of hummocks 14, whereby they produce a corrugated effect upon said bottom and, as the conveyer rotates, these hummocks will agitate the batches of water and peas to thus thoroughly scour and wash the same of any foreign matter when the device is used as a washer. In some instances, where the device is utilized solely as a blancher, these agitators may be dispensed with.

By referring again to Fig. 1 of the drawings, it is apparent that, as the spiral conveyer revolves, a measured quantity of the material is stored within the head 4' and, as the leg 4 revolves to approximately a vertical position downwardly, the accumulated material is discharged into the bottom cup section with which the leg has communication. Thus, with each revolution of the spiral conveyer, a batch of the product is delivered to the first cup section and from this cup section it is caused to travel to the preceding cup section and so on until all the cup sections at the bottom of the conveyer are loaded. Hence it follows that, as the batch is discharged into the hopper 9, a fresh batch is emptied into the first cup section B, whereby the blanching or washing process is made continuous.

While I have shown and described a simple exemplification of my invention, it is obvious that the details of construction may be varied in many instances within the knowledge of skilled mechanics, whereby the same result is accomplished, such variations being within the scope of my invention.

I claim:

1. A machine for treating vegetables comprising a driven inwardly extending U-shaped spiral conveyer, means for initially feeding batches of material to said conveyer whereby said batches are discharged into the lower sections of the first flight of the same, and means for collecting the batches at the opposite end of said conveyer.

2. A machine for treating products comprising a driven conveyer the flights of which are U-shaped in cross-section and extending inwardly to form cups at the lower portions of said conveyer flights, means for introducing batches of fluid and solid matter into the lower portion of the first flight of said conveyer, and means for agitating the batches coincident to their travel through said conveyer.

3. A mechanism for treating vegetable products comprising a spiral conveyer the flights of which are U-shaped in cross-section and extended inwardly, a valve-controlled fluid supply nozzle in communication with the first flight of said conveyer, a valve-controlled pulse supply nozzle in communication with said first flight, and a receiver at the discharge end of said conveyer.

4. A machine for treating products to be canned comprising a driven spiral conveyer, the flights of which are U-shaped in cross-section and extended inwardly to form cups at the lower portions of said conveyer flights, nozzles arranged to effect communication between the lower portion of the first flight of said conveyer, means for causing intermittent feed from the nozzles to the first flight of the conveyer coincident to each rotation thereof.

5. A machine for treating products to be canned comprising a driven spiral conveyer the flights of which are U-shaped in cross-section and extended inwardly to form cup sections at the lower portions of said conveyer flights, means for intermittently introducing fluid in measured quantities to the lower cup sections of the first flight of said conveyer, means for intermittently introducing a measured quantity of the product to be canned into the cup sections of said first flight, whereby batches are successively introduced into said cup sections with each revolution of the conveyer, and means for collecting the measured batches at the opposite end of said conveyer.

In testimony that I claim the foregoing I have hereunto set my hand at Milwaukee in the county of Milwaukee and State of Wisconsin in the presence of two witnesses.

EDWARD J. VAUDREUIL.

Witnesses:
 GEO. W. YOUNG,
 M. E. DOWNEY.